UNITED STATES PATENT OFFICE.

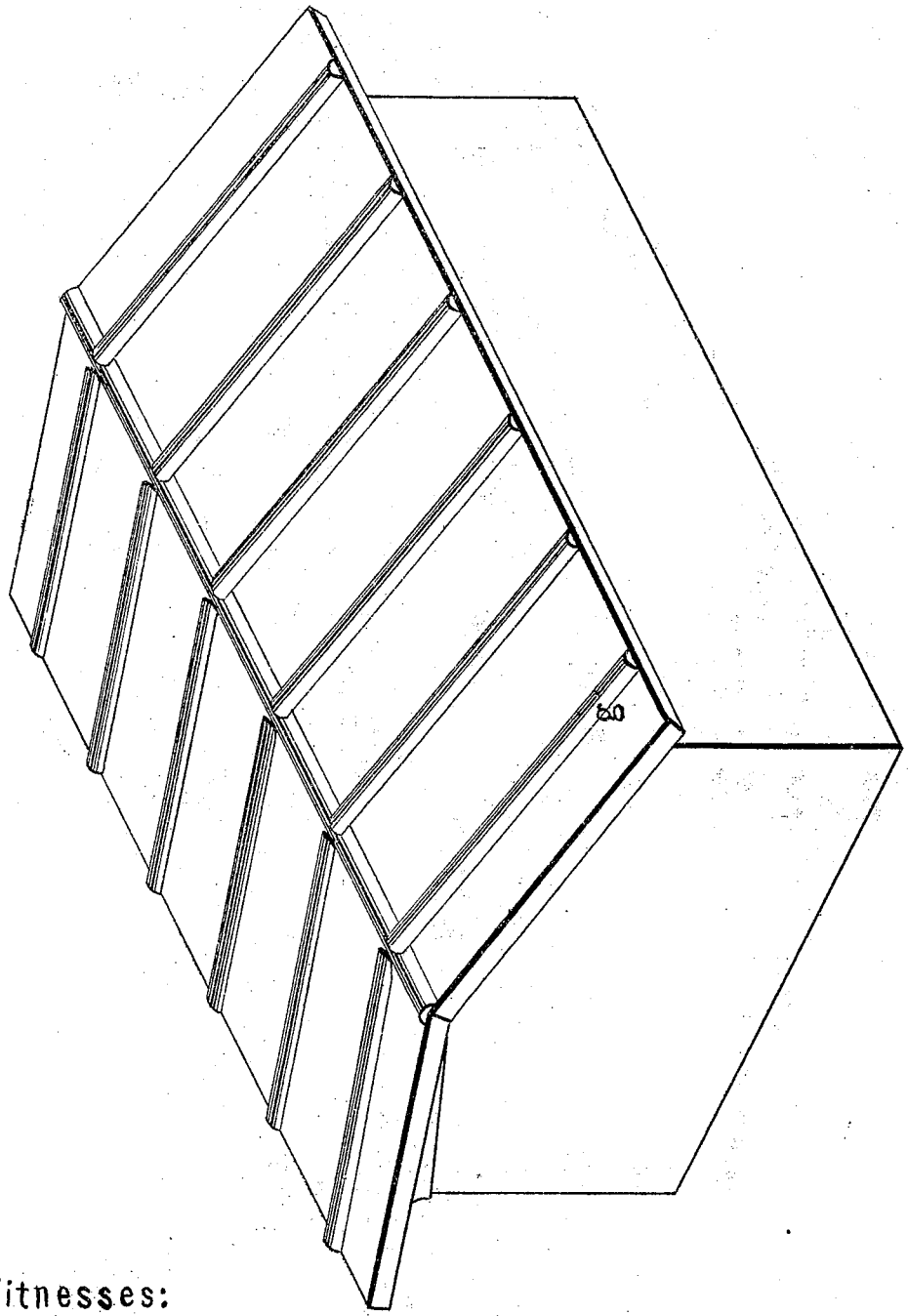

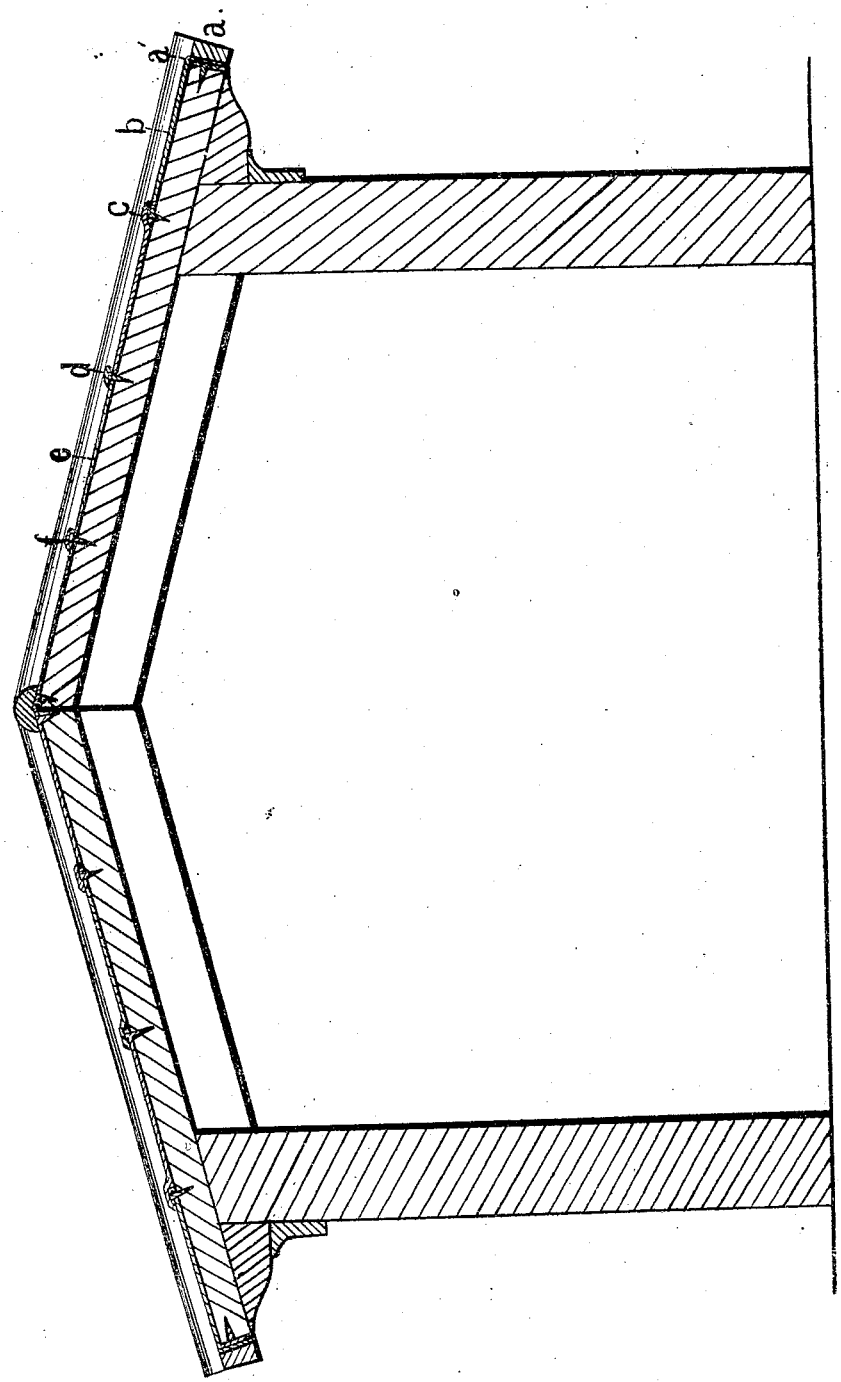

DAVID M. AYER, OF LEWISTON, MAINE.

IMPROVED ROOFING.

Specification forming part of Letters Patent No. 38,646, dated May 26, 1863.

*To all whom it may concern:*

Be it known that I, DAVID M. AYER, of Lewiston, in the county of Androscoggin, in the State of Maine, have invented a new, useful, and Improved Roofing; and I hereby declare that the following is a full and exact description thereof, reference being had to the accompanying drawings, and to the letters of reference marked thereon.

The nature of my invention consists in boiling cotton, hemp, jute, or flax cloth four hours in clean water, to remove all vegetable and animal grease, then steep it twelve hours in a decoction of cutch and sulphate of copper, in about the following proportions, viz: twenty pounds of cutch and two pounds of sulphate of copper to one hundred gallons of water. The cutch and sulphate of copper are taken up by the fibers of the cloth and give it more body and act as a preservative. They also prevent the absorption of too much of the oil in the composition, and thereby injuring the fiber and rendering the composition dry and brittle so as to cause it to cleave off. The cloth should be put into the decoction at boiling-heat. When taken from this liquor, it should be allowed to drain about one hour, after which it is passed through a solution of bichromate of potash, in proportion of about two pounds of bichromate of potash to one hundred gallons of water at 150° Fahrenheit. This is used to fasten the cutch and sulphate of copper upon the fibers of the cloth. The cloth is then washed in clean color-water, after which it is passed through a weak size made of starch or gum and hydrochloride of zinc. The size is employed to stiffen and smooth the cloth, to facilitate the laying. The zinc is used to prevent the size from going into destructive putrefaction and to impart, in a general sense, durability. After it is taken from the size it is dried and smoothed on a calender. The roof-boards are planed to a uniform thickness and matched, laid smooth side up. The whole surface of the roof is then painted with fire-proof paint and linseed-oil and allowed to dry. This coat of paint is put on to fill the pores of the wood, so that the wood will not absorb so much of the oil of the composition, which is laid between the cloth and boards, as to render it dry and brittle, and thereby prevent the cloth from adhering to the boards by means of the composition. Then a coat of composition is applied to the boards, of the following ingredients and proportions, viz: boiled linseed-oil, one gallon; red lead, one pound; asphaltum, one pound. These are well boiled together for two hours, at a gentle boil. To this add sufficient fire-proof paint to produce the consistency desired to spread well. The red lead is used to dry and harden the composition and give body. The asphaltum is also used to give body, but the chief object is to impart an elastic quality to the composition to prevent it from cracking by contraction or expansion or by the warping of the roof-boards, or other similar causes. This is applied to a section of the roof, Figure 2, *a*, nearest the eaves, and in width equal to the width of the piece of the prepared cloth, Fig. 2, *b*, which is bedded in the composition with the edge drawn down over the edge of the roof-boards, Fig. 2, *a a'*, at the eaves and tacked firmly to the edge of the board with common tacks. The cloth is then drawn tight and smooth toward the ridge, Fig. 2, *c*, and slightly tacked; then another strip of cloth is laid on the one last described, with the edges nearest the ridge, Fig. 2, *d*, placed evenly together, and firmly tacked to the roof-boards, after which the cloth, near the tack-heads, is well saturated with the composition, also another section of the roof. This piece of cloth is bedded in this, Fig. 2, *e*, and tacked, as before described, Fig. 2, *f*. Proceed in the above-described manner till the whole roof is covered. After the whole is covered I nail cleats or strips of board onto the edge of the eaves and upon the rake to cover the tack-heads and to prevent the cloth from tearing where tacked. This is also bedded in composition. I also put strips or cleats of boards, with one edge rounded thus, (see Fig. 1, *g*,) upon the whole roof, running from the eaves to the ridge, at intervals of from twenty to twenty-four inches, or upon each rafter. This being bedded in composition and well nailed, it serves to keep the cloth in its place should it fail to adhere to the roof-boards by means of the composition. It also adds to the beauty of the roof. The whole roof, cloth, and cleats are then covered with a coat of composition and clean dry pond or sea sand, and allowed to remain several days to dry; then the surplus sand is swept off and another coat of composition and sand put on as before.

What I claim as my invention, and desire to secure by Letters Patent, is—

1. The preparation of the cloth, substantially as and for the purpose set forth.

2. The composition for covering the cloth, substantially as described.

3. The roof, constructed of the materials and in the manner set forth.

In witness that I claim the foregoing I have hereunto set my hand in the presence of two witnesses.

D. M. AYER.

Witnesses:
S. H. GARCELON,
FOSTER H. RANDALL.